(12) United States Patent
Huang et al.

(10) Patent No.: US 7,580,122 B2
(45) Date of Patent: Aug. 25, 2009

(54) IMAGE INSPECTION METHOD BY POLARIZED COMPENSATION FOR DEFORMATION OF LENS

(75) Inventors: Kuo-Cheng Huang, Hsinchu (TW); Wen-Hong Wu, Hsinchu (TW); Chia-Wei Hsu, Hsinchu (TW); Ting-Ming Huang, Hsinchu (TW)

(73) Assignee: Instrument Technology Research Center, Hsinchu (TW)

( * ) Notice: Subject to any disclaimer, the term of this patent is extended or adjusted under 35 U.S.C. 154(b) by 385 days.

(21) Appl. No.: 11/519,477

(22) Filed: Sep. 12, 2006

(65) Prior Publication Data

US 2007/0058160 A1 Mar. 15, 2007

(30) Foreign Application Priority Data

Sep. 13, 2005 (TW) .............................. 94131552 A

(51) Int. Cl.
*G01B 9/00* (2006.01)
*G01B 21/00* (2006.01)
*G01J 4/00* (2006.01)
(52) U.S. Cl. ..................... 356/124; 356/364; 356/239.2
(58) Field of Classification Search ......... 356/364–369, 356/239.1–239.6, 124
See application file for complete search history.

(56) References Cited

U.S. PATENT DOCUMENTS

| 5,305,090 A * | 4/1994 | Kowalski ..................... 356/366 |
| 6,067,155 A * | 5/2000 | Ringlien .................. 356/240.1 |
| 6,903,821 B2 | 6/2005 | Nara et al. |
| 6,920,180 B1 | 7/2005 | Yamane et al. |

FOREIGN PATENT DOCUMENTS

| TW | 485253 | 5/2002 |
| TW | 200428361 | 12/2004 |

\* cited by examiner

*Primary Examiner*—L. G Lauchman
(74) *Attorney, Agent, or Firm*—The Webb Law Firm

(57) ABSTRACT

A lens inspection device and method are provided. The lens inspection method includes the steps of providing a collimating light beam, polarizing the collimating light beam by a polarizer to produce a polarized light beam, deflecting the polarized light beam by a lens to be measured to produce a deflected light beam, providing a phase retardation plate through which a polarized compensation image is generated, and comparing the polarized compensation image with a lookup table having standard color values of a plurality of standard polarization compensated images recorded therein, so as to determine whether a deformation is presented on the lens.

19 Claims, 6 Drawing Sheets

IMAGE INSPECTION METHOD BY POLARIZED COMPENSATION FOR DEFORMATION OF LENS

FIELD OF THE INVENTION

The present invention relates to a lens inspection device and method for inspecting whether a deformation is presented on a lens, and more particular to a lens inspection device and method for measuring whether a deformation is presented on a lens by polarized image compensation.

BACKGROUND OF THE INVENTION

For the recent years, the vigorous development of the electro-optic industry, particularly the digital camera and the cellular phone camera industries, has placed a larger and larger demand for the optical elements. Of the optical elements, the optical lens can be the most essential and important one.

The optical lens takes many kinds, which are manufactured by different methods depending on the used materials and the applications thereof. For the manufacturing, the production speed of the optical lens has to be promoted with the quality thereof taken into consideration. In this regard, an optical inspection method capable of rapidly and precisely inspecting the optical lens is a long-felt desire in the industry.

Generally, deformity is generally involved in the outline of the lens, e.g. the plastic lens, due to the residual stress or absorbed water therein. Thus, the wavefront of an optical lens is generally presented with the sphere aberration, astigmatism and coma. In the prior art, the inspection of the outline deformation is generally performed by using a profiler. However, the using of the profiler often has the problems of a prolonged inspection time and only some straight line data acquired. Accordingly, the inspection data for determining the quality of the optical lens can not be validly and real time obtained with respect to the mass produced optical lenses.

The polariscope is also utilized to inspect the deformation of the optical lens in the prior art. Due to the crystal structure of the lens, the incident optical beam experiences different indices of refraction when walking through the different crystal directions. This is called the "birefringence" of the crystal. Accordingly, two differently polarized rays are generated when the optical beam goes through the lens, with each of the polarized rays having a vibration direction perpendicular to the other and with one termed as the "ordinary" ray and the other as the "extraordinary" ray. By determining a phase retardation between the ordinary and extraordinary rays, whether the deformation is presented on the lens can be known. However, the birefringence of the lens when not being affected by the residual stress is not significant, it is not possible to detect a sufficient phase retardation variation with respect to the lens by merely using the polariscope.

To overcome the above mentioned problems, the polariscope has to be further improved so that a significant phase retardation variation can be obtained for the inspection of the deformity of the lens. In this regard, the inventors have been involved with a series of intensive research and experiments and finally sets forth an image inspection method by polarized compensation for deformation of lens as the present invention. Compared with the prior art, the present invention is capable of inspecting not only the deformation of the lens by using the real time image but also the residual stress inside the lens. Further, the present invention may be used to inspect the focusing or image quality of an optical system.

SUMMARY OF THE INVENTION

In accordance with an aspect of the present invention, a method for inspecting whether a deformation exists on a lens is provided, which comprises the steps of providing a collimating light beam, transmitting the collimating light beam through a first polarizer so as to produce a polarized light beam, transmitting the polarized light beam through the lens so as to produce a deflected light beam, transmitting the deflected light beam through a phase retardation plate so as to produce a first part of polarized compensation image in a longitudinal direction and a second part of polarization compensated image in a traverse direction, and analyzing polarization compensated image so as to determine whether the deformation exists on the lens.

In an embodiment, the step of analyzing further comprises a step of providing an analyzer for observing polarization compensated image.

In an embodiment, the step of analyzing further comprises a step of providing an image sensor device for detecting polarization compensated image.

In an embodiment, the method further comprises a step of providing an image analyzing software for analyzing polarization compensated image.

In an embodiment, the method further comprises a step of filtering polarization compensated image to obtain a red-blue component and a green component thereof.

In an embodiment, the red-blue component is used for determining whether the lens has a decenter and a tilt.

In an embodiment, the green component is used for determining whether the lens has a spherical aberration and a residual stress.

In an embodiment, the image analyzing software has a lookup table having phase retardations recorded therein and polarization compensated image is analyzed by being compared with the phase retardations recorded in the lookup table.

In an embodiment, each of the phase retardations satisfies the following equation:

$$\delta(\varphi, \alpha) = \frac{2\pi}{\lambda} \cdot \frac{d}{\cos\varphi} \cdot N_o \left[ \frac{N_e}{\sqrt{N_o^2 \cos^2\varphi + N_e^2 \sin^2\varphi}} - 1 \right] \cdot \cos\alpha + \frac{2\pi}{\lambda} \cdot \frac{d}{\cos\varphi} \cdot [N_e - N_o] \cdot \sin\alpha,$$

wherein $\delta$ is a phase retardation of the deflected light beam after passing through the phase retardation plate, $\varphi$ is a refraction angle of the deflected light beam, $\alpha$ is a position angle of the deflected light beam, $\lambda$ is a wavelength of the collimating light beam and d is a thickness of the phase retardation plate.

In accordance with another aspect of the present invention, a method for inspecting a measured lens is provided, which comprises the steps of providing a first and second polarizers and a phase retardation plate, setting a standard planar lens between the first and second polarizers, adjusting a relative position of the first and second polarizers, the standard planar lens and the phase retardation plate so as to obtain a completely symmetric polarization compensated image, providing a calculation program so as to establish a lookup table of phase retardations of a plurality of polarization compensated images each obtained from a corresponding one of a plurality of lens at a plurality of position angles $\alpha$ of the deflected light beam and a plurality of refraction angles $\varphi$ of the deflected light beam, providing a standard spherical lens in place of the standard planar lens, comparing phase retardations of a second polarization compensated image associated with the standard spherical lens by referring to the phase retardations in the lookup table for the standard spherical lens so as to color-calibrate the second polarization compensated image, replacing the spherical lens with the measured lens, providing an image sensor for recording the third polarization compensated image associated with the measured lens, and determining whether a deformation exists on the measured lens according to the third polarization compensated image.

In an embodiment, the step of determining comprises the steps of dividing the third polarization compensated image obtained from the measured lens into a red-blue component and a green component, determining whether the measured lens has a decenter and a tilt according to the red-blue component, and determining whether the measured lens has a spherical aberration and a residual stress according to the green component.

In an embodiment, the standard planar lens has two sides having a parallel precision less than 5" and a surface form deviation less than $\lambda/4$, wherein $\lambda=632.8$ nm.

In an embodiment, the standard spherical lens has two sides having a parallel precision less than 30" and a surface form deviation less than $\lambda/4$, wherein $\lambda=632.8$ nm.

In an embodiment, each of the phase retardations satisfies the following equation:

$$\delta(\varphi, \alpha) = \frac{2\pi}{\lambda} \cdot \frac{d}{\cos\varphi} \cdot N_o \left[ \frac{N_e}{\sqrt{N_o^2\cos^2\varphi + N_e^2\sin^2\varphi}} - 1 \right] \cdot \cos\alpha + \frac{2\pi}{\lambda} \cdot \frac{d}{\cos\varphi} \cdot [N_e - N_o] \cdot \sin\alpha,$$

wherein $\delta$ is a phase retardation of the deflected light beam after passing through the phase retardation plate, $\varphi$ is a refraction angle of the deflected light beam, $\alpha$ is a position angle of the deflected light beam, $\lambda$ is a wavelength of the collimating light beam and d is a thickness of the phase retardation plate.

In accordance with still another aspect of the present invention, a lens inspection device is provided, which comprises a light source, a polarizer disposed downstream with respect to the light source so as to produce a polarized light beam to a lens so as to produce a deflected light beam therefrom, a phase compensator disposed downstream with respect to the lens so as to produce a first part of polarization compensated image in a longitudinal direction and a second part of polarization compensated image in a traverse direction, and an analyzer disposed downstream with respect to the phase compensator so as to observe a variation of the polarization compensated image.

In an embodiment, each of the polarizer and the analyzer has a polarization perpendicular to each other.

In an embodiment, the phase compensator is a full-wavelength phase retardation plate.

In an embodiment, each of the polarizer and the analyzer has a polarization direction parallel to each other.

In an embodiment, the phase compensator is a half-wavelength phase retardation plate.

In an embodiment, the lens inspection device further comprises an image sensor disposed downstream with respect to the analyzer for recording the variation of the polarization compensated image.

BRIEF DESCRIPTION OF THE DRAWINGS

The above contents and the advantages of the present invention will become more readily apparent to those ordinarily skilled in the art after the following detailed descriptions and accompanying drawings are reviewed, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

Figure 1:
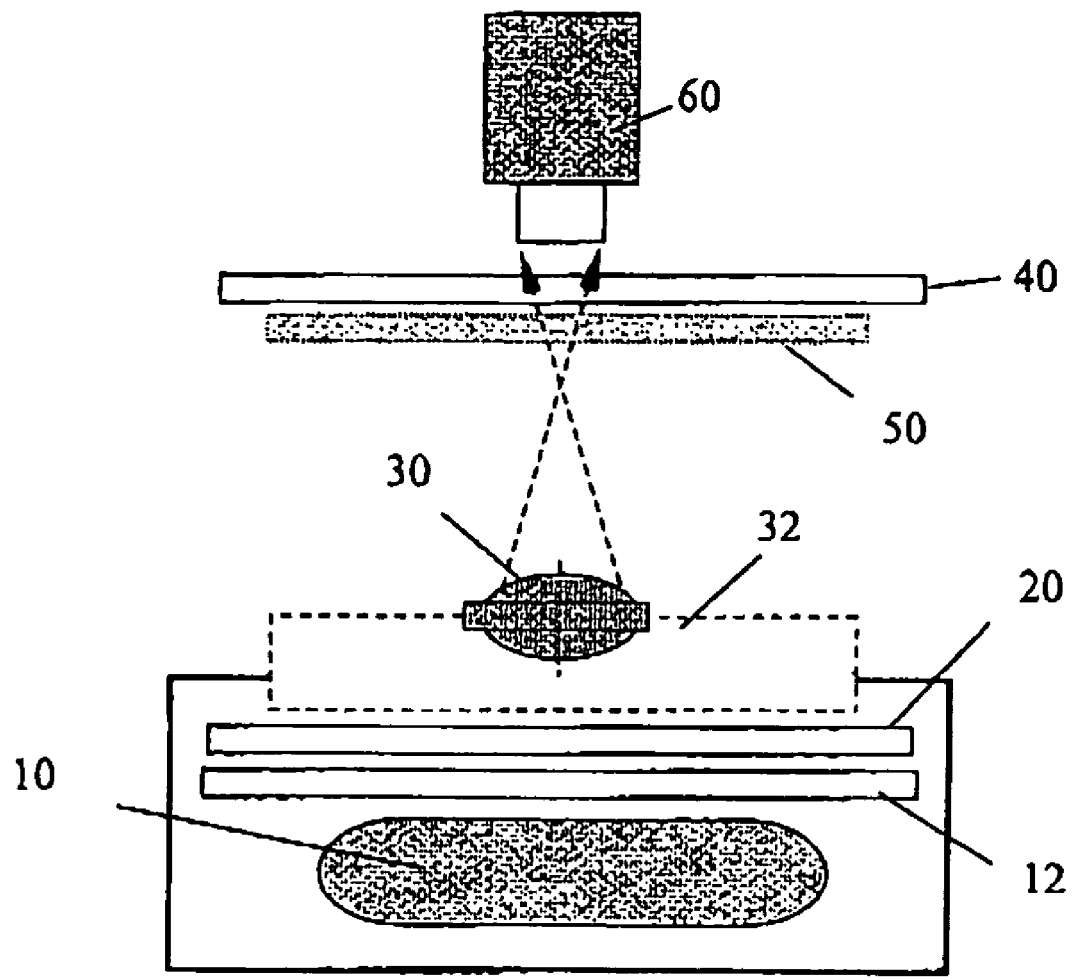
FIG. 1 is a schematic view of a lens inspection device according to the present invention.

Referring to FIG. 1, which is a schematic diagram of a lens inspection device according to the present invention. The lens inspection device 100 mainly comprises a light source 10, a polarizer 20, an analyzer 40, a phase compensator 50 and an image sensor 60. A diffuser 12 is provided at a path through which a light emitted from the light source 10 passes so as to produce a collimating light beam from the light source 10. The polarizer 20 is disposed downstream with respect to the diffuser 12 for the collimating light beam to produce a polarized light beam from the collimating light beam. A lens 30 to be inspected is disposed downstream with respect to the polarizer 20 for the polarized light beam so that a deflected light beam can be produced from the polarized light beam. If the lens 30 is a convex lens, the deflected light beam proceeds convergently. On the other hand, if the lens 30 is a concave lens, the deflected light beam proceeds divergently. In an embodiment, the lens 30 is carried on an adjustment base 32 and a relative position of the lens 30 and the light source 10 may be changed by adjusting the adjustment base 32.

When passing through the lens 30, the deflected light beam is polarized at two directions due to the birefringence of the lens 30 and thus has different phase variations, forming a phase retardation between the two polarization directions. To enlarge the phase retardation, the phase compensator 50 is introduced. The phase compensator 50 is a phase retardation plate. In terms of the phase retardation of the two polarized light beams, the phase compensator may be categorized into a full-wavelength, half-wavelength and quarter-wavelength phase compensators. Now, the full-wavelength phase compensator is taken for the illustration. A pink background light beam is provided. After passing through the polarizer 20 and the lens 30, the background light beam becomes a green light beam (550 nm) and is deflected. When the green light beam passes through the phase retardation plate 50, a deconstructive interference is occurred on the green light beam at a longitudinal axis direction of the phase retardation plate 50 and thus the green light beam is converted into a red light beam (650 nm) (an ordinary ray). In a traverse axis direction of the phase retardation plate 50, the green light beam is otherwise converted into a blue light beam (450 nm) (an extraordinary ray). Once the plastic lens has a deformation, symmetric and asymmetric are alike, such as the optical sphere aberration, astigmatism and coma, the light beam passing therethrough will has a deviated propagating direction.

To effectively detect the above mentioned wavelengths, the analyzer 40 is provided downstream with respect to the phase compensator 50 for the ordinary ray and the extraordinary ray. The analyzer 40 is in essence a polarizer and may have a polarization direction parallel or perpendicular to that of the polarizer 20. In the former case, the phase retardation plate 50 should be the half-wavelength phase retardation plate 50. In the latter case, the phase retardation plate 50 should be the full-wavelength phase retardation plate 50.

Figure 2A:
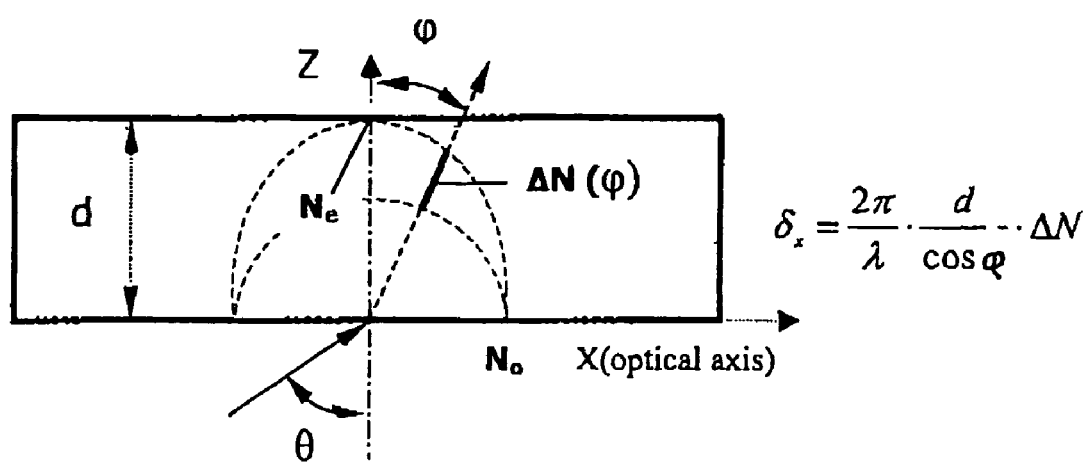
FIG. 2A through FIG. 2C are diagrams for illustrating a phase retardation $\delta$ of a phase retardation plate as a function of a refraction angle $\psi$ and a position angle $\alpha$ according to the present invention.
Figure 2B:
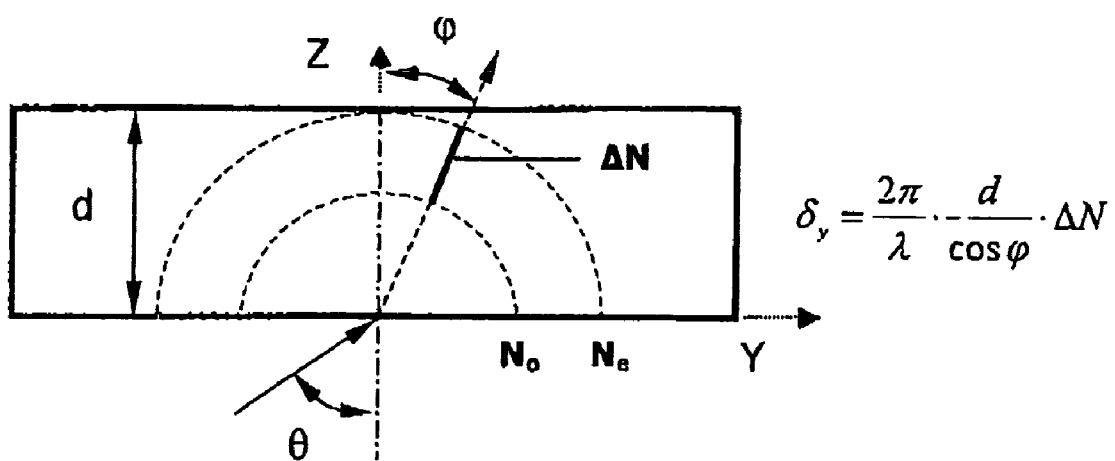
Figure 2C:
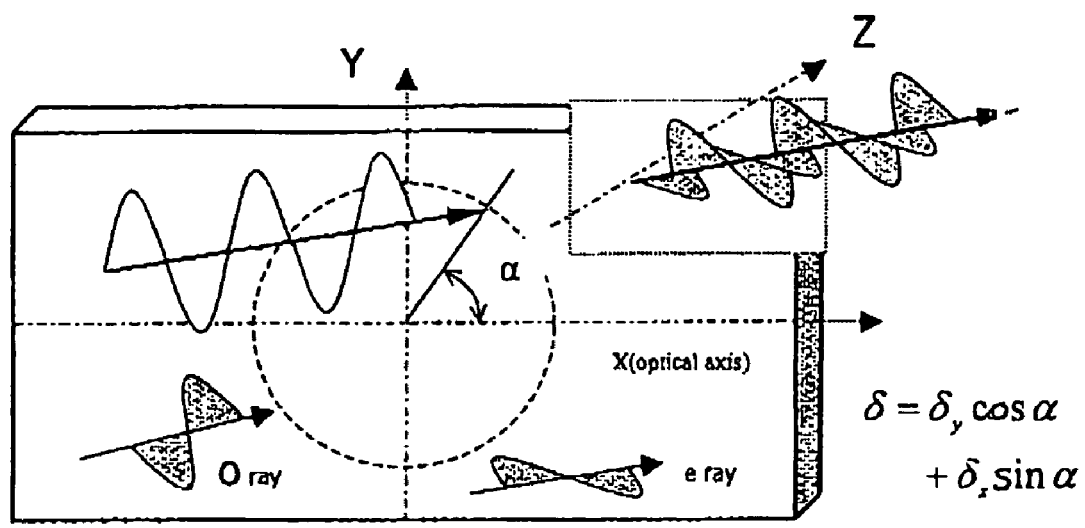

At this time, the red light beam converted from the green light beam at the longitudinal axis direction is presented cyan when being observed through the analyzer 40. And the blue light beam converted from the green light beam at the traverse axis direction is presented orange when being observed through the analyzer 40. However, since the deflected light beam from the lens 30 is incident to the phase retardation plate 50 from different angles, a phase retardation δ provided by the phase retardation plate 50 is dependent on a refraction angle ϕ and a position angle α of the deflected light beam. Referring to FIG. 2A through 2C, a relationship of the phase retardation δ and the refraction angle ϕ and the position angle α is illustrated therein. In the illustration, an optical axis of the lens is assumed as the X-axis and the optical axis of the phase retardation is assumed as the Z-axis. An incident light beam at the position angle α on the Y-Z and X-Z planes is taken for the exemplary illustration. The phase retardation δ between the two polarized light beams (the ordinary and extraordinary rays) is explained below.

The following is dedicated to the illustration of a phase retardation δ at the X-Z plane. As shown in FIG. 2A, when the deflected light beam is incident to the full-wavelength phase retardation plate, the phase retardation δ provided by the full-wavelength phase retardation plate is expressed as:

$$\delta = \frac{2\pi}{\lambda} \cdot d \cdot |n_o - n_e|, \quad \text{(Eq. 1)}$$

wherein δ is the phase retardation, λ is the wavelength of the deflected light beam, $n_o$ and $n_e$ are refraction coefficients at the two refraction directions (the directions where the ordinary ray and the extraordinary ray occur) of the phase retardation plate and d is a thickness of the phase retardation plate.

When the deflected light beam is considered, an index of refraction on the X-Z plane varies as the refraction angle ϕ of the polarized light beam changes. Thus, an index difference of refraction ΔN(ϕ) is expressed as:

$$\Delta N(\varphi) = N(\varphi) - N_o = \frac{N_o N_e}{\sqrt{N_o^2 \cos^2\varphi + N_e^2 \sin^2\varphi}} - N_o. \quad \text{(Eq. 2)}$$

In addition, an actual light path length in the thickness of the phase retardation plate also varies as the refraction angle ϕ changes and thus the actual light path length is expressed as:

$$d^* = \frac{d}{\cos\varphi}. \quad \text{(Eq. 3)}$$

Accordingly, a phase retardation difference δ is expressed as:

$$\delta(\varphi) = \frac{2\pi}{\lambda} \cdot d^* \cdot \Delta N(\varphi) = \frac{2\pi}{\lambda} \cdot \frac{d}{\cos\varphi} \cdot \Delta N(\varphi), \quad \text{(Eq. 4)}$$

wherein λ is the wavelength of the deflected light beam and d is the thickness of the phase retardation plate.

The following is dedicated to the phase retardation δ at the Y-Z plane. On the Y-Z plane, the index of refraction does not vary as the refraction angle ϕ of the polarized light beams changes and the index difference of refraction ΔN(ϕ) is a constant $N_e - N_o$, which may be known in FIG. 2B. Accordingly, the phase retardation δ is expressed as:

$$\delta(\varphi) = \frac{2\pi}{\lambda} \cdot d^* \cdot [N_e - N_d] = \frac{2\pi}{\lambda} \cdot \frac{d}{\cos\varphi} \cdot [N_e - N_o], \quad \text{(Eq. 5)}$$

wherein λ is the wavelength of the deflected light beam and d is the thickness of the phase retardation plate.

The following will be dedicated to a phase retardation δ of the phases retardation plate for the deflected light beam at an arbitrary position angle α. As shown in FIG. 2C, when the deflected light beam is incident at a position angle α to the phase retardation plate, the incident light beam is divided into two components on the X-Z and Y-Z planes, respectively. By referring to Eq. 4 and Eq. 5, the phase retardation at any of the planes can be expressed as:

$$\delta(\varphi, \alpha) = \frac{2\pi}{\lambda} \cdot \frac{d}{\cos\varphi} \cdot N_o \left[ \frac{N_e}{\sqrt{N_o^2 \cos^2\varphi + N_e^2 \sin^2\varphi}} - 1 \right] \cdot \cos\alpha + \frac{2\pi}{\lambda} \cdot \frac{d}{\cos\varphi} \cdot [N_e - N_o] \cdot \sin\alpha. \quad \text{(Eq. 6)}$$

With the phase retardation δ obtained, a standard chromatic diagram of the lens can be found with parameters of the lens and the phase retardation lens known previously known. In an embodiment, the standard chromatic diagram may be stored as a lookup table (LUT) so that it may be conveniently compared with the polarization compensated images of the lens observed. Accordingly, the image sensor device 60 is generally disposed downstream with respect to the analyzer 40 for the deflected light beam. The image sensor device 60 may be a charge coupled device (CCD) and complemented metal oxide semiconductor (CMOS) cameras. As such, the polarization compensated images of the lens 30 can be recorded by using the image sensor device 60.

Figure 3A:
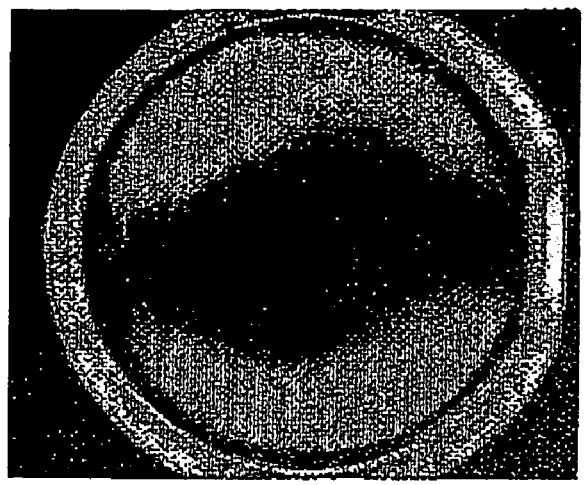
FIG. 3A through FIG. 3C are real measurement diagrams of polarization compensated images and a red-blue component and a green component of the respective polarization compensated images.
Figure 3B:
Figure 3C:

The present invention also discloses a method for inspecting a whether a deformation is presented on the lens, which is achieved by comparing the polarization compensated images of the lens and a standard chromatic diagram or a lookup table of the lens. The method may be performed on the above described lens inspection device. In the method, an optical axis of the lens inspection device is first calibrated by providing a standard planar lens with two sides thereof having a parallel precision less than 5" and a surface form deviation less than λ/4 (λ=632.8 nm). The standard planar lens is disposed between the two polarizers. A relative position of the two polarizers, the standard planar lens and the phase retardation plate is adjusted so that the polarization compensated image is completely symmetric. Next, a standard spherical lens with two sides thereof having a parallel precision less than 30" and a surface form deviation less than λ/4 (λ=632.8 nm) is provided in place of the above standard planar lens for color calibration of the lens inspection device. Then, an image sensor is used to record the polarized compensated images formed by the standard spherical lens. In color calibrating, the colors involved in the polarization compensated image is compared to a theoretical diagram obtained in Eq. 6. Subsequently, a lens to be measured is provided in place of the standard spherical lens and the image sensor is used to record the polarization compensated image of the lens. The thus-formed polarization compensated image detected by the image sensor is shown in FIG. 3A. Then, the polarization compensated image is color filtered by an image processing program or a filter to obtain a red-blue image component and a green image component (as shown in FIG. 3B and FIG. 3C respectively) so that the deformation of the lens may be inspected. This is because the red-blue light can lead to a significant contrast of the colors of the polarization compensated images on the long and short axes and thus whether the red-blue image is symmetric with a center axis is easily to be determined, which can be known from FIG. 3B. Accordingly, any decenter or tilt inherent in the lens can be readily inspected. From FIG. 3C, a dark field (to which an arrow points) in the green image indicates a residual stress on the lens.

While the invention has been described in terms of what is presently considered to be the most practical and embodiment, it is to be understood that the invention needs not be limited to the disclosed embodiments. For example, although the full-wavelength phase retardation plate is used in the measurement of the polarization compensated images, other types of phase retardation plate is also contemplated for the same reason. Accordingly, it is intended to cover various modifications and similar arrangements included within the spirit and scope of the appended claims which are to be accorded with the broadest interpretation so as to encompass all such modifications and similar structures.

What is claimed is:

1. A method for inspecting whether a deformation exists on a lens, comprising the steps of:
    providing a collimating light beam;
    transmitting the collimating light beam through a first polarizer so as to produce a polarized light beam;
    transmitting the polarized light beam through the lens so as to produce a deflected light beam;
    transmitting the deflected light beam through a phase retardation plate so as to produce a first part of polarized compensation image in a longitudinal direction and a second part of polarization compensated image in a traverse direction;
    filtering the polarization compensated image to obtain a red-blue component and a green component thereof; and
    analyzing the red-blue component and the green component so as to determine whether the deformation exists on the lens.

2. The method as claimed in claim 1, wherein the step of analyzing further comprises a step of providing an analyzer for observing the polarization compensated image.

3. The method as claimed in claim 1, wherein the step of analyzing further comprises a step of providing an image sensor device for detecting the polarization compensated image.

4. The method as claimed in claim 1, further comprising a step of providing an image analyzing software for analyzing the polarization compensated image.

5. The method as claimed in claim 1, wherein the red-blue component is used for determining whether the lens has a decenter and a tilt.

6. The method as claimed in claim 1, wherein the green component is used for determining whether the lens has a spherical aberration and a residual stress.

7. The method as claimed in claim 4, wherein the image analyzing software has a lookup table having phase retardations recorded therein and the red-blue component and the green component are analyzed by being compared with the phase retardations recorded in the lookup table.

8. The method as claimed in claim 7, wherein each of the phase retardations satisfies the following equation:

$$\delta(\varphi, \alpha) = \frac{2\pi}{\lambda} \cdot \frac{d}{\cos\varphi} \cdot N_o \left[ \frac{N_e}{\sqrt{N_o^2\cos^2\varphi + N_e^2\sin^2\varphi}} - 1 \right] \cdot \cos\alpha + \frac{2\pi}{\lambda} \cdot \frac{d}{\cos\varphi} \cdot [N_e - N_o] \cdot \sin\alpha,$$

wherein $\delta$ is a phase retardation of the deflected light beam after passing through the phase retardation plate, $\varphi$ is a refraction angle of the deflected light beam, $\alpha$ is a position angle of the deflected light beam, $\lambda$ is a wavelength of the collimating light beam and d is a thickness of the phase retardation plate.

9. A method for inspecting a measured lens, comprising the steps of:
    providing a first and second polarizers and a phase retardation plate;
    setting a standard planar lens between the first and second polarizers for producing a polarization compensated image;
    adjusting a relative position of the first and second polarizers, the standard planar lens and the phase retardation plate so as to obtain a completely symmetric state of the polarization compensated image;
    providing a calculation program so as to establish a lookup table of phase retardations of a plurality of polarization compensated images each obtained from a corresponding one of a plurality of lens at a plurality of position angles $\alpha$ of the deflected light beam and a plurality of refraction angles $\varphi$ of the deflected light beam;
    providing a standard spherical lens in place of the standard planar lens;
    comparing phase retardations of a second polarization compensated image associated with the standard spherical lens by referring to the phase retardations in the lookup table for the standard spherical lens so as to color-calibrate the second polarization compensated image;
    replacing the spherical lens with the measured lens;
    providing an image sensor for recording the third polarization compensated image associated with the measured lens; and
    determining whether a deformation exists on the measured lens according to the third polarization compensated image.

10. The method as claimed in claim 9, wherein the step of determining comprises the steps of:
    dividing the third polarization compensated images obtained from the measured lens into a red-blue component and a green component;
    determining whether the measured lens has a decenter and a tilt according to the red-blue component; and
    determining whether the measured lens has a spherical aberration and a residual stress according to the green component.

11. The method as claimed in claim 9, wherein the standard planar lens has two sides having a parallel precision less than 5" and a surface form deviations less than $\lambda/4$, wherein $\lambda$=632.8 nm.

12. The method as claimed in claim 9, wherein the standard spherical lens has two sides having a parallel precision less than 30" and a surface form deviations less than $\lambda/4$, wherein $\lambda$=632.8 nm.

13. The method as claimed in claim 9, wherein each of the phase retardations satisfies the following equation:

$$\delta(\varphi, \alpha) = \frac{2\pi}{\lambda} \cdot \frac{d}{\cos\varphi} \cdot N_o \left[ \frac{N_e}{\sqrt{N_o^2 \cos^2\varphi + N_e^2 \sin^2\varphi}} - 1 \right] \cdot \cos\alpha + \frac{2\pi}{\lambda} \cdot \frac{d}{\cos\varphi} \cdot [N_e - N_o] \cdot \sin\alpha,$$

wherein $\delta$ is a phase retardation of the deflected light beam after passing through the phase retardation plate, $\phi$ is a refraction angle of the deflected light beam, $\alpha$ is a position angle of the deflected light beam, $\lambda$ is a wavelength of the collimating light beam and d is a thickness of the phase retardation plate.

14. A lens inspection device, comprising:
a light source;
a polarizer disposed downstream with respect to the light source so as to produce a polarized light beam to a lens so as to produce a deflected light beam therefrom;
a phase compensator disposed downstream with respect to the lens so as to produce a first part of polarization compensated image in a longitudinal direction and a second part of polarization compensated image in a traverse direction; and
an analyzer disposed downstream with respect to the phase compensator so as to filter the polarization compensated image to obtain a red-blue component and a green component thereof.

15. The lens inspection device as claimed in claim 14, wherein each of the polarizer and the analyzer has a polarization perpendicular to each other.

16. The lens inspection device claimed in claim 15, wherein the phase compensator is a full-wavelength phase retardation plate.

17. The lens inspection device claimed in claim 14, wherein each of the polarizer and the analyzer has a polarization direction parallel to each other.

18. The lens inspection device claimed in claim 17, wherein the phase compensator is a half-wavelength phase retardation plate.

19. The lens inspection device claimed in claim 14, further comprising an image sensor disposed downstream with respect to the analyzer for recording the variation of the polarization compensated image.

* * * * *